(No Model.) 8 Sheets—Sheet 1.

B. J. GIFFORD & J. E. JONES.
APPARATUS FOR CLEANING, WIDENING, AND DEEPENING WATER COURSES.

No. 321,355. Patented June 30, 1885.

(No Model.)  
8 Sheets—Sheet 2.

B. J. GIFFORD & J. E. JONES.
APPARATUS FOR CLEANING, WIDENING, AND DEEPENING WATER COURSES.

No. 321,355.  Patented June 30, 1885.

(No Model.) 8 Sheets—Sheet 4.
B. J. GIFFORD & J. E. JONES.
APPARATUS FOR CLEANING, WIDENING, AND DEEPENING WATER COURSES.
No. 321,355. Patented June 30, 1885.

(No Model.) 8 Sheets—Sheet 5.

B. J. GIFFORD & J. E. JONES.
APPARATUS FOR CLEANING, WIDENING, AND DEEPENING WATER COURSES.

No. 321,355. Patented June 30, 1885.

(No Model.) 8 Sheets—Sheet 6.

B. J. GIFFORD & J. E. JONES.
APPARATUS FOR CLEANING, WIDENING, AND DEEPENING WATER COURSES.

No. 321,355. Patented June 30, 1885.

UNITED STATES PATENT OFFICE.

BENJAMIN J. GIFFORD AND JAMES E. JONES, OF RANTOUL, ILLINOIS.

APPARATUS FOR CLEANING, WIDENING, AND DEEPENING WATER-COURSES.

SPECIFICATION forming part of Letters Patent No. 321,355, dated June 30, 1885.

Application filed September 29, 1884. (No model.)

*To all whom it may concern:*

Be it known that we, BENJAMIN J. GIFFORD and JAMES E. JONES, citizens of the United States, residing at Rantoul, in the county of Champaign and State of Illinois, have invented certain new and useful Improvements in Methods of and Apparatus for Cleaning, Widening, and Deepening Water-Courses, of which the following is a specification, to wit:

This invention relates to ditching and dredging; and it consists in the apparatus employed for utilizing the lateral and upward pressure and force of water for deepening, widening, and cleaning ditches, streams, &c., substantially as will be hereinafter more fully set forth and claimed.

In order to enable others skilled in the art to which our invention appertains to make and use the same, we will now proceed to describe its construction and operation, referring to the accompanying drawings, in which—

Figs. 9 and 10 show in two positions a peculiar device for preventing the escape of water under the hinged and inclined wings of the dam.

Figure 7:
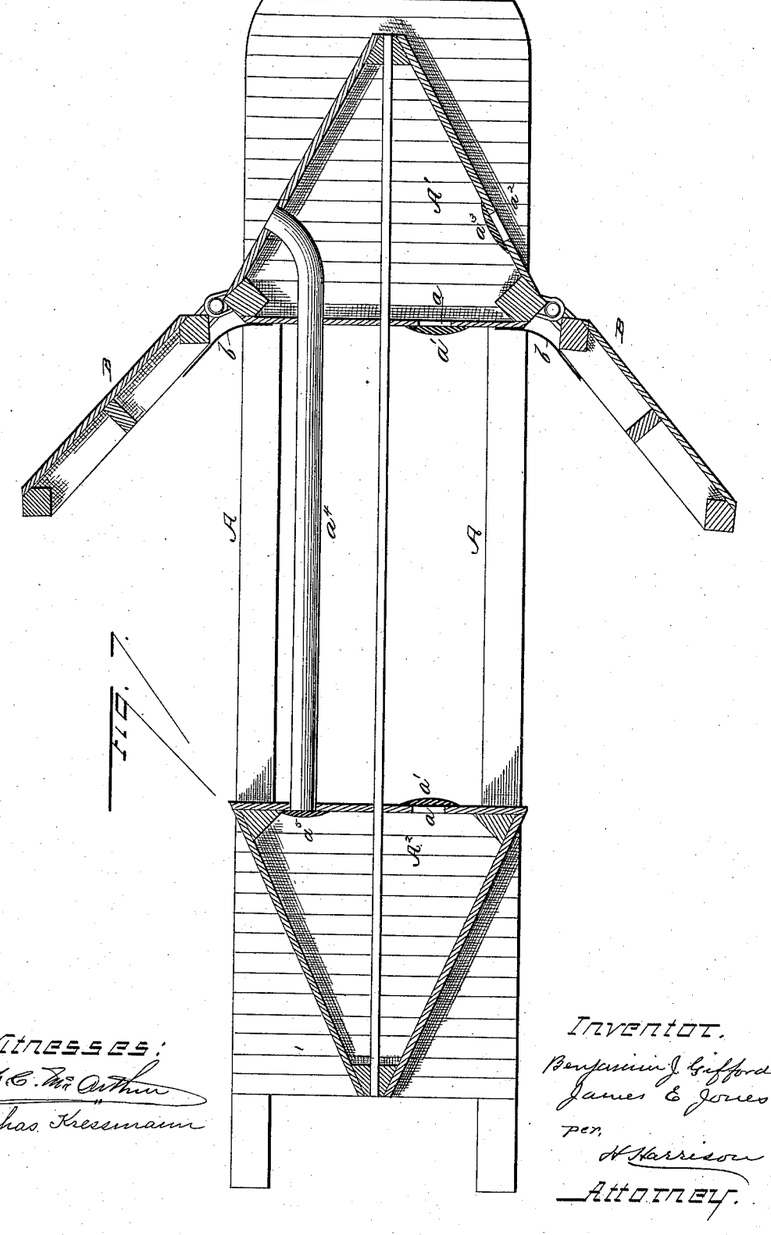
Fig. 7 is an enlarged horizontal section of the central portion of the dam, representing the openings for filling and emptying its tanks, and the mode of securing to it the hinged wings.

It being well known that water exerts a pressure in all directions, and that earth and other articles lose much of their weight when placed therein, we design to utilize this by constructing a movable dam which adapts itself to the inequalities of the bottom and sides of ditches, streams of all kinds, and water-ways which require cleaning, widening, or deepening, which dam is forced forward by the lateral pressure of the water and draws behind it a plow or similar device which deepens, widens, and cleans the channel and deposits the dirt excavated at the sides of the ditch or stream. This object we effect in the following manner:

A represents the frame of the central position of our movable dam, upon which are two tanks or reservoirs, A' A², for holding water to ballast or sink the device in the proper manner. Each tank is provided with an inlet-opening, $a$, having a valve, $a'$, operated by any suitable device from the top of the frame. The forward tank has also an outlet-opening, $a^2$, closed by a valve, $a^3$, and the rear tank is provided with an outlet-pipe, $a^4$, passing entirely through the other tank, and closed by a valve, $a^5$, as fully shown in Fig. 7. The water, being dammed back behind the structure, is admitted to either of the tanks at will by operating the valves, and as the water runs off in front of the dam, leaving little or none there, it is also run out of either tank without difficulty, and the ends of the frame A are thus lightened or weighted, as may be found desirable.

To the sides of the central frame and its tanks are hinged, in any manner found most desirable, wings B B, which swing freely on their hinges, as will be evident. The joints between the main frame and the wings are covered by strips of canvas $b$ or other flexible material, which is secured to the frame, and is held over the hinge by the pressure of the water. A similar strip of flexible waterproof material, $b'$, is secured to the bottom of said hinged sections, and is pressed down upon the bottom of the ditch or stream to prevent the escape of water under the dam, and is provided with leads or weights at the outer edge to cause it to sink to place. The pressure of water upon the wings, it is at once evident, will tend to carry them forward or outward till they reach or pass a line at right angles with the course of the structure. It is desirable that this should not only be prevented, but that it should be done in such manner that the wings B may be drawn in or swung out and secured firmly at the angle desired. To do this, we connect the outer ends of the wings B by a rope or chain, $b^2$, which is passed back and forth across the frame through pulleys $b^3$ on the wings, and its ends secured to a windlass, B', in the upper part of the frame A, between the tanks, and by which the rope or chain is drawn in or paid out to accomplish the desired result, as will be at once understood.

Figure 1:
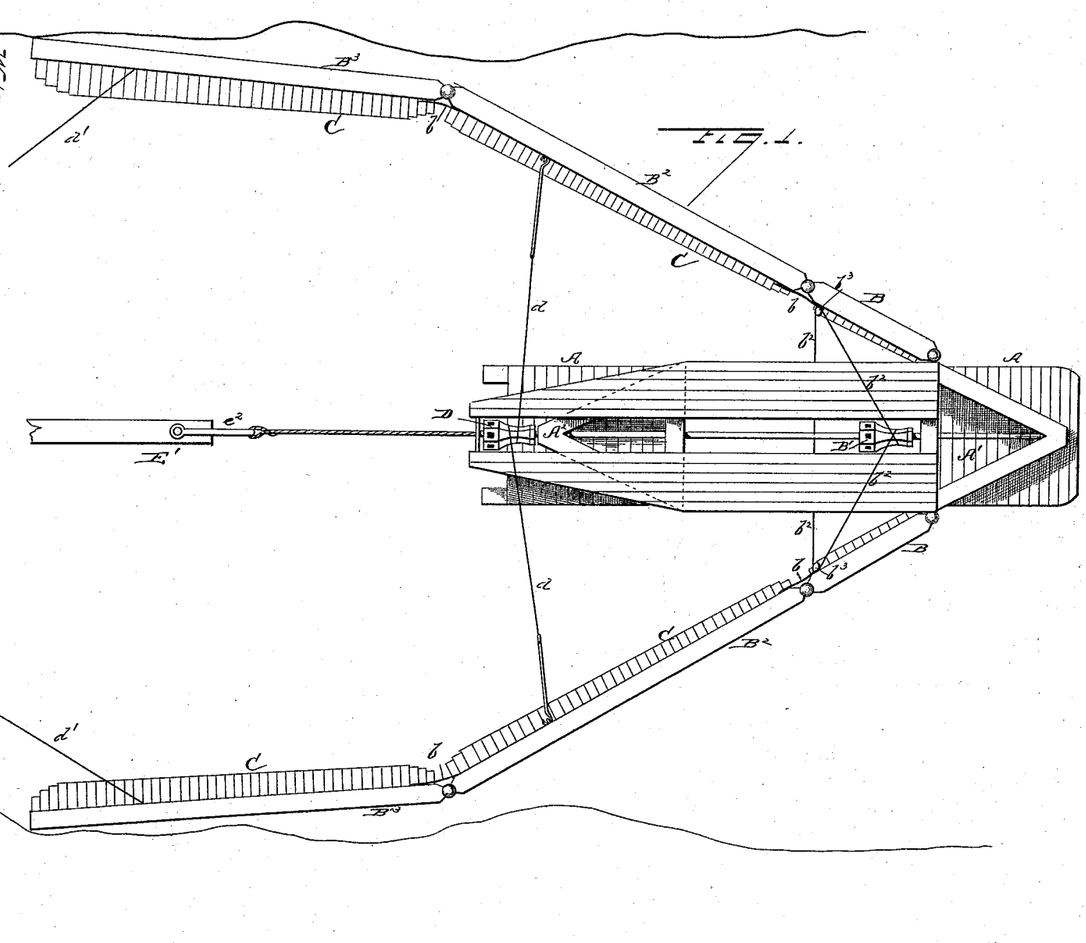
Figure 1 is a plan view of a movable dam suitable to our purpose.

To the outer ends of the wings B are hinged other wings or sections, $B^2$, and to them still others, $B^3$, and so on indefinitely, according to the width of the stream in which the device is to be used, though it will always be used with as few joints or sections as possible, it being better, where such is practicable, not to exceed the number shown in Fig. 1. These wings are constructed with top horizontal and bottom on an incline or slope of about one in four, or such slope as may be necessary to meet the maximum slope from the perpendicular of the ditch or water-channel to be operated upon. Whence it becomes manifest that the wings, closed so as to be parallel with the center frame of the dam, would fit perpendicular banks, and any slope between a perpendicular and such maximum would be fitted by the spreading of the wings, which is done by the force of the water automatically.

Figure 2:
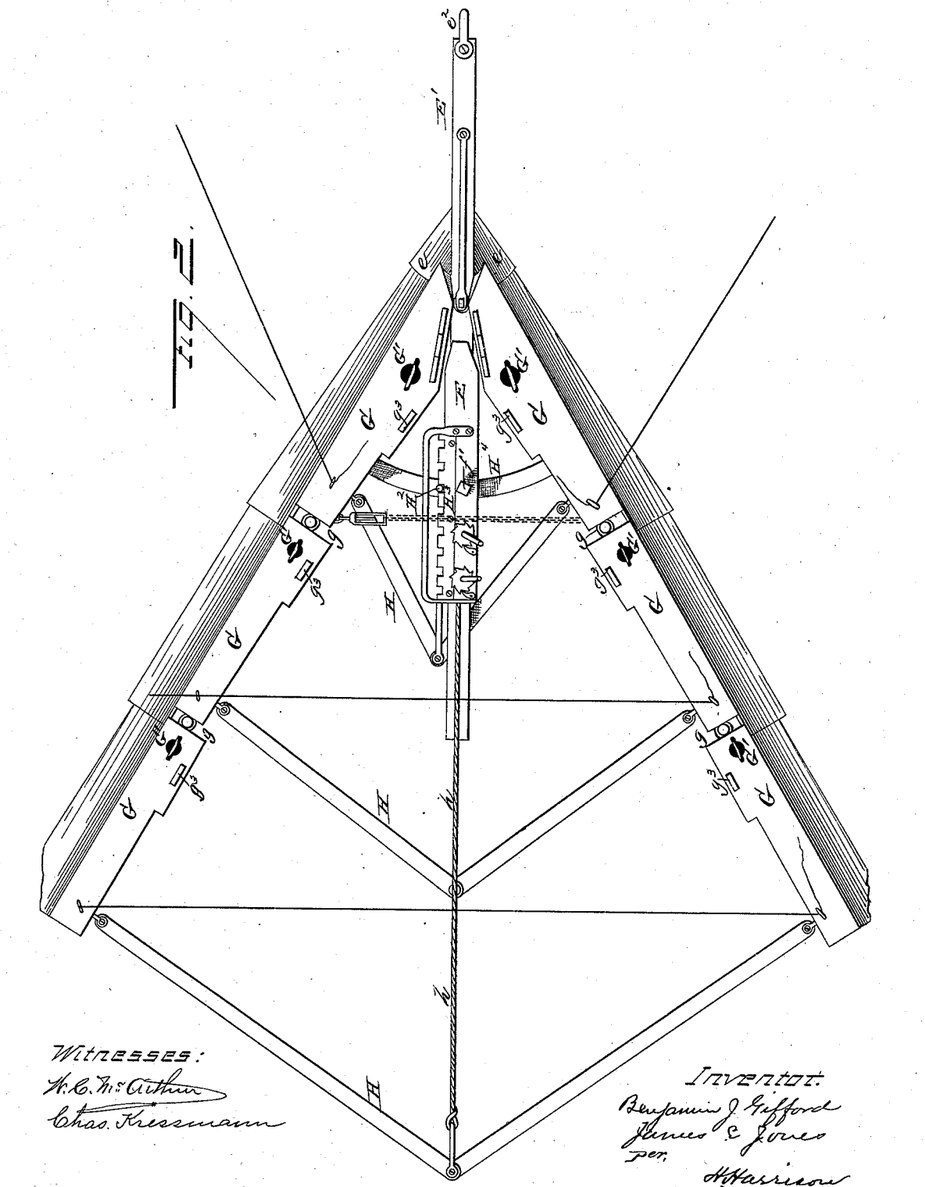
Fig. 2 is a similar view of a ditching or dredging plow used in connection with the dam.
Figures 2, 10:
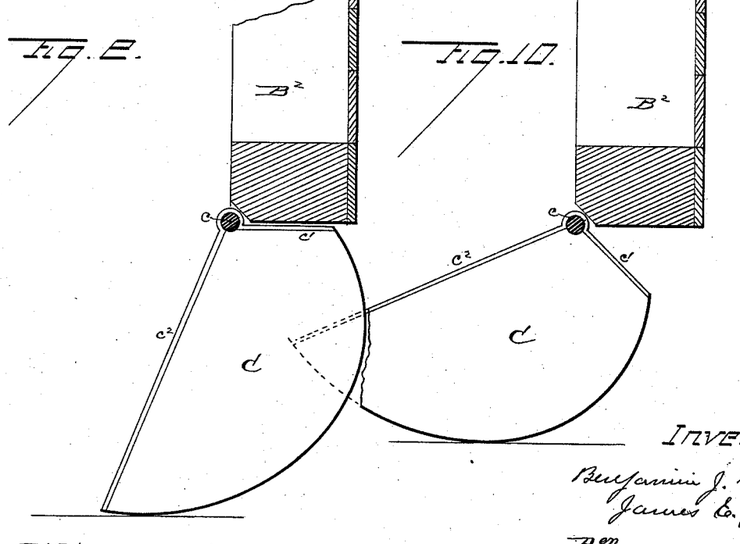
Figure 3:
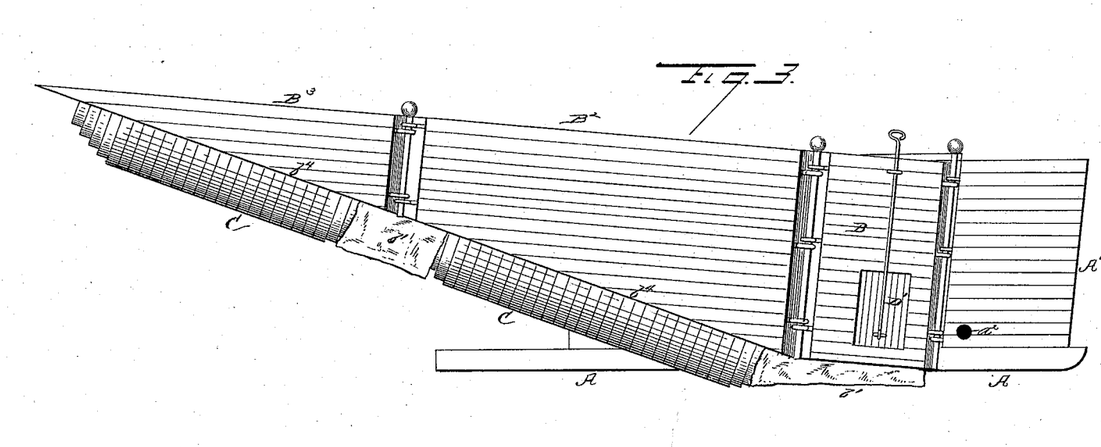
Fig. 3 is a side elevation, and Fig. 4 a longitudinal vertical section, of the dam.

The joints of each section are covered by strips of flexible material, as described, and also provided with strips along their lower edges, which latter are inclined, as already described, and indicated at $b^4$ of the drawings. While in some cases the strips of canvas with weighted edges are all that is needed for short sections to prevent the passage of water beneath the dam, yet in case the sections are long, or where the bottom is very uneven or covered by snags or rocks, these strips would be liable to become caught and torn, and we therefore provide other means to supplement the canvas, as follows:

C represents a series of thin pieces of wood or other suitable material hinged to a rod, $c$, along the inner lower edge of the hinged wings, as seen in Figs. 1 and 3, and fully represented in the enlarged sections of Figs. 9 and 10. These pieces are preferably weighted upon their lower ends, to cause them to fall readily in the water, and are upon their upper ends formed with a straight portion, $c'$, which abuts against the wing, as in Fig. 9, and prevents the piece from swinging under the dam. The rear side or edge slants back, as at $c^2$, and the forward or contact edge is curved, as shown in the drawings. This curve is preferably of substantially the form herein shown, and is such that the lowest or contact point will be brought somewhat in rear of the hinge-rod, upon which the pieces hang, and remains always in the same vertical line, no matter to what angle the piece C may be turned by the inequalities of the ground, as in Fig. 10. The object of this is manifest. The dragging pressure of the piece C upon the bottom will be governed by the volume of water resting vertically upon it in front of its contact-point. By thus locating the point of contact with the earth in rear of the hinge the segments C contact with the ground always at a given distance in rear of the pivot upon which they swing. In other words, the face of the parts C is so curved that as it swings upon its pivotal point in rising and falling its contact-point will always remain in the same vertical line at a given distance in rear of the pivot, and the column of water resting upon said segment, and acting to pack them into contact with the ground, will be the same in horizontal area, however varying in depth of water or position of the segment. This overcomes the tendency of the parts to drag heavier at one time than at another, and the segments C, being perfectly free to rise and fall as the surface may vary, readily adjust themselves to the surface traversed and prevent the escape of water under the dam.

Figure 4:
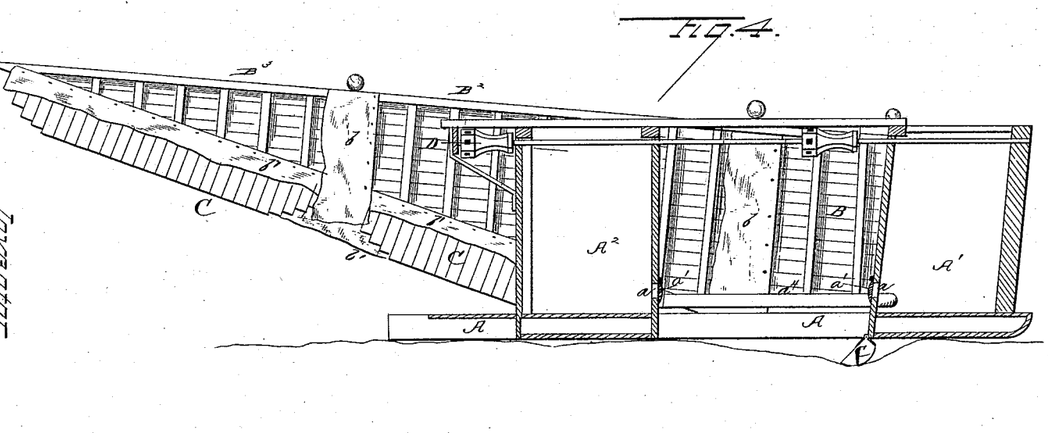
Figure 5:
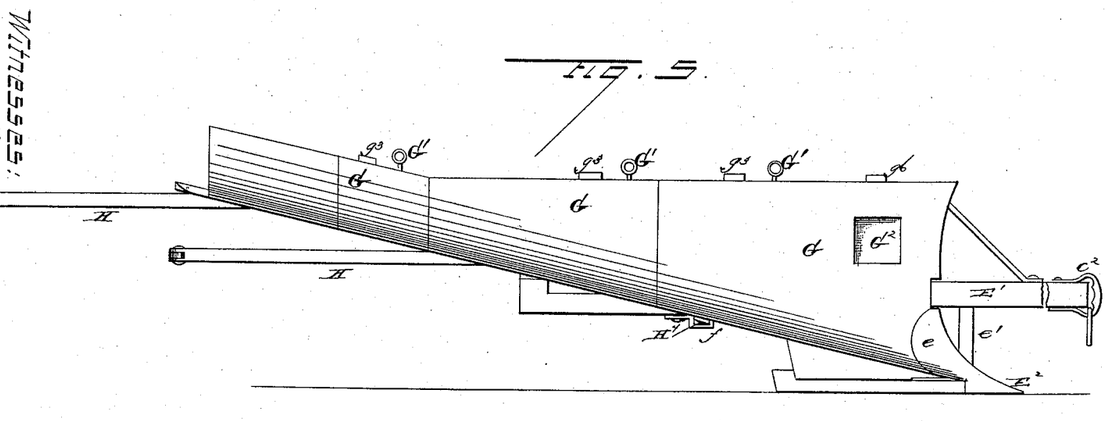
Fig. 5 is a side elevation, and Fig. 6 a longitudinal vertical section, of the plow.
Figure 6:
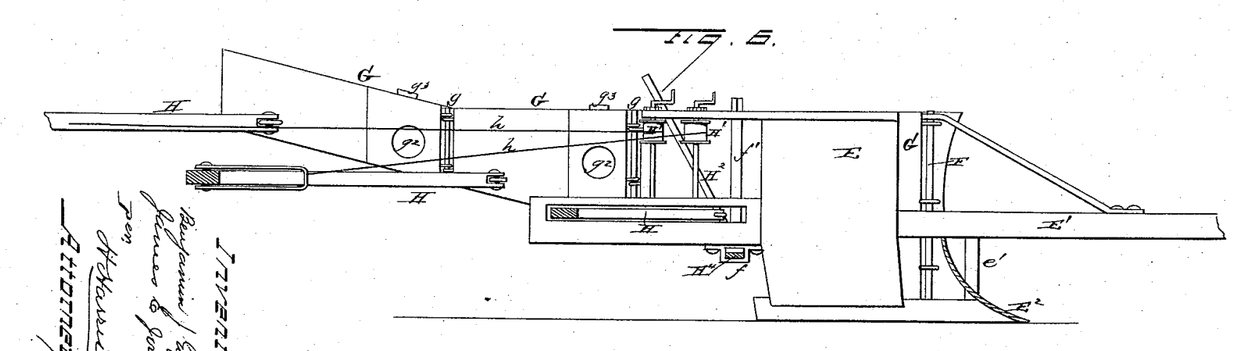
Figure 8:
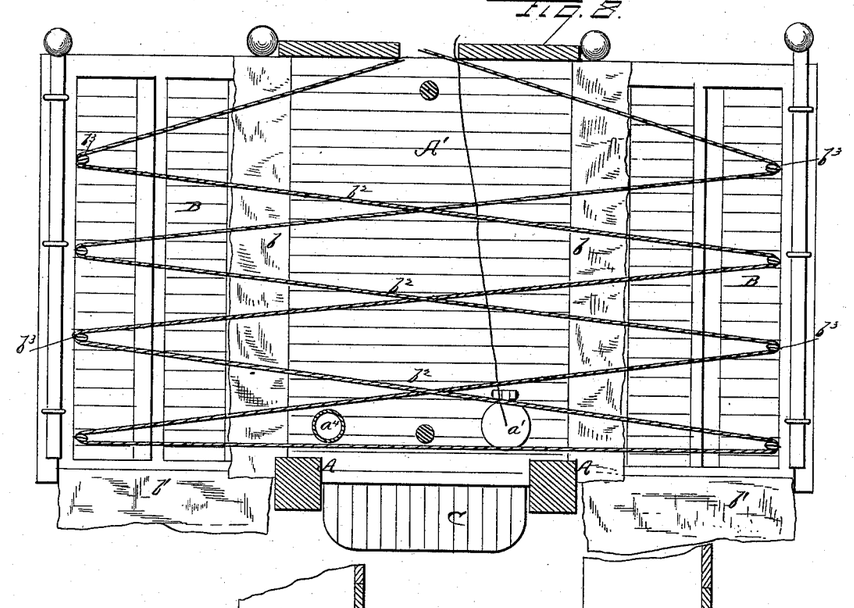
Fig. 8 is an enlarged cross-section through the central portion of the dam, and shows the manner of rendering the joints of the wings water-tight and the mode of tying them against the pressure of the water.
Figure 13:
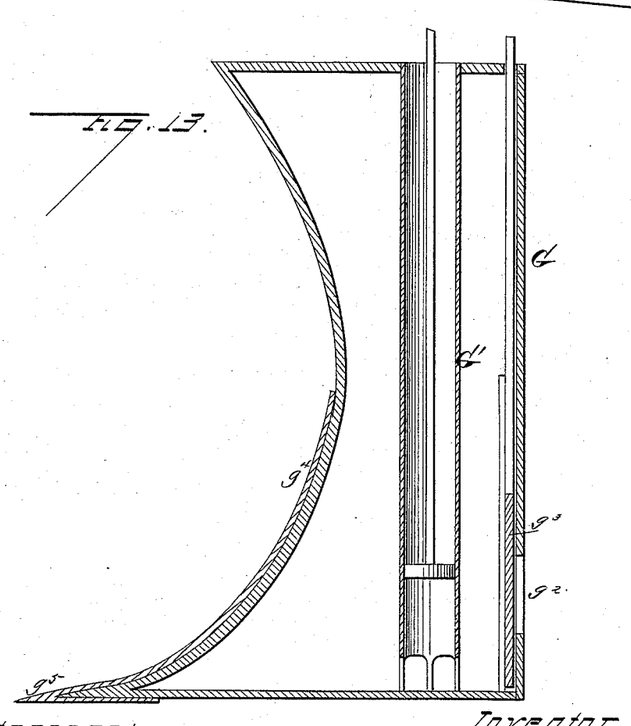

As seen in Figs. 4 and 8, the same devices are applied to the under side of the main frame of the tanks on a line connecting the hinged wings, and the whole thus forms a movable and water-tight dam that conforms at once and automatically to the shape of the water-way. The hinged sections $B^2 B^3$ of the wings are respectively provided with brace cords or chains $d\ d'$, which are secured to the windlass D of the main frame and to the plow behind, as represented in the drawings, and these serve to control the parts and transmit the power to the resistance to be overcome. The dam constructed as we have described is placed in the stream to be enlarged, and sunk to the bottom by filling the tanks, as described. The folded wings are then allowed to swing out till they rest gently at an angle against the banks and completely dam the stream, the inclined edges of the wings and their hinged pieces C enabling them to fit the banks and stop the flow of water. As soon as sufficient water has collected its lateral pressure carries this dam forward at a speed depending upon the volume or supply of water in rear of the dam at any point. If at any time it is desired to stop, the gates D' in the wings are opened to let the water escape, or the wings themselves are hauled in to allow it to pass around them, as may be found most desirable. By this means we purpose collecting and controlling the water, and we apply its force to the proper enlargement of water-channels in the following manner:

E represents the main frame of our plow or excavator, which may be termed a "second dam," and which is provided with a beam, E', and a point, $E^2$, provided with a small steel wing or share, $e$, upon each side, and a center cutter, $e'$, connecting it with the beam, as in Figs. 5 and 6. The forward end of the plow-beam is furnished with a clevis, $e^2$, and is connected either directly or by a chain or rope with the rear end of the central portion of the movable dam, by which it is drawn forward, as presently described. In the forward part of the main frame of the plow is a vertical shaft or standard, F, to which is hinged the shares or mold-boards G of the plow, which are constructed on a similar incline to that of the frame and which may be swung out or in to any required angle. Each share G is made in several parts jointed or hinged together, as at $g$, and at these joints the forward section is formed with an overlapping portion, $g'$, lying upon the outer sides of the adjoining section, to properly direct and deliver the excavated material, as shown in the drawings. Each section G is formed hollow and water-tight, and its outer side is curved somewhat similar to the mold-board of an ordinary plow, and each is upon its inner side formed with an opening, $g^2$, by which water may be admitted to its interior, and this is closed by a gate, $g^3$, sliding in suitable guides, as fully shown in Fig. 13. A pump, G', is also provided for discharging this water, and the outer curved side is protected to a suitable height by a sheet of metal, $g^4$, to prevent too great wear upon the side of the hollow mold-board. At the lower outer corner is also secured a knife or cutter, $g^5$, which cuts and removes the dirt, as will be evident. In addition to the opening for admitting water to the interior of the sections, the forward section upon each side of the main frame is formed with an opening, $G^2$, passing entirely through the section and closed by gates $g^6$, by which the water may be permitted to pass through the plow to act upon the dam ahead.

Figure 11:
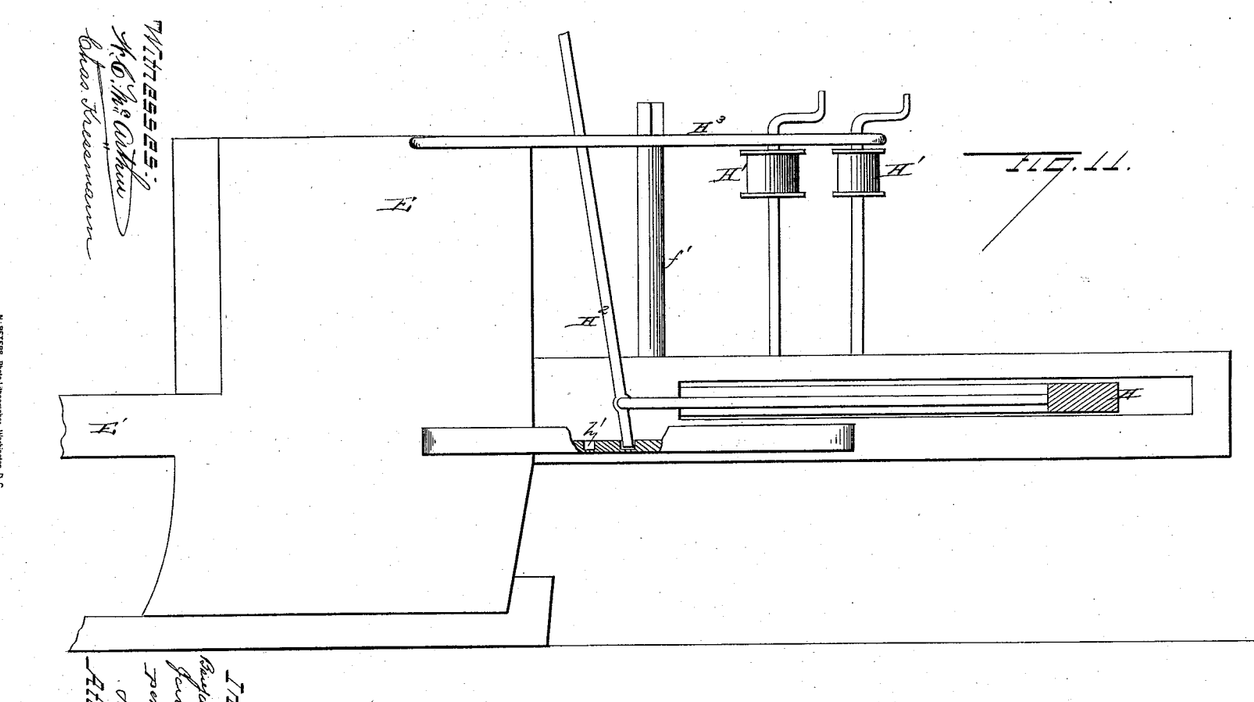
Fig. 11 represents the manner of setting forward and bracing the hinged wings of the plow.
Figure 12:
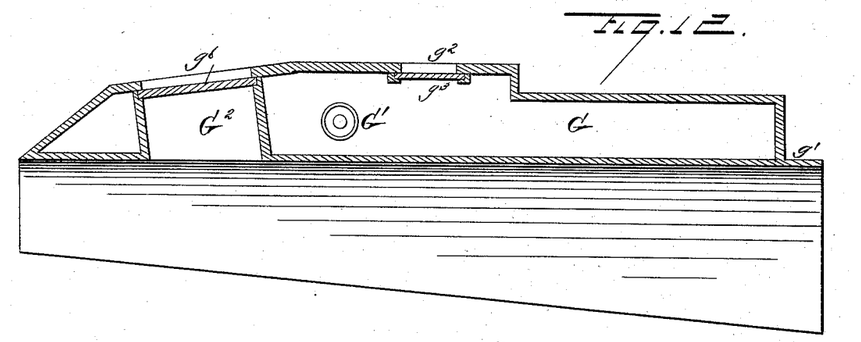
Fig. 12 is a horizontal section, and Fig. 13 a vertical cross-section, of one of the hollowings of the plow.

The sections being hinged to the frame and to each other, it is evident that as they are drawn forward into the dirt and mud the resistance of the latter will tend to press the sections backward in exact proportion to the difference between this resistance and the pressure of the water behind them. To meet this difficulty, we connect the corresponding sections across the machine by braces H, jointed at their centers, and the two rear braces are connected by chains or cords $h\ h$ with the windlass or capstans H' in the main frame, as in Figs. 2, 6, and 11, and by these means the sections are thrown outward and firmly held in position. The forward sections are also connected by jointed braces H, which are set up as required by connection with a lever, H², stepped in one of a series of steps, $h'$, on the main frame, and secured above by a notched rack, H³, as in Figs. 2 and 11. In addition to this, each forward section is provided on its under side with a circular bar, H⁴, which bars lie one upon the other beneath the frame E in a boxing, $f$, and are secured, when adjusted, by a screw-set rod, $f'$, as shown, which admits of the wings being operated at the same elevation.

It will be seen that the lower or cutting edges of the hollow wings incline upward from the main frame, and thus are adapted to cut a channel of proper form, deeper at its center than at its edges, upon the banks of which the dirt excavated is deposited by the wings.

The plow being placed in proper position, and water admitted to its wings when necessary to sink them, they are adjusted to the width of the desired cut (which may be changed while in motion) and secured firmly in that position. The water now collects behind the dam till sufficient force is accumulated to start it, and the whole device is then carried forward at greater or less speed by the force of the water following readily and naturally the direction of the water-course. The dirt removed by the plow is taken up and deposited at the sides of the stream, and, being almost entirely moved beneath the water, is thus relieved of much of its weight and nearly all its friction, and is moved with much less than the usual power. The wings of the plow are of sufficient height to form a second dam, and being formed hollow the water may be pumped out of them sufficiently to balance and lift the excavated material, being deprived of most of its weight by the water in which it moves, as above stated.

The device is intended for use in cleaning, widening, or deepening the channel of any stream or water-course to which it may be applied; but is especially designed for use in the artificially-made ditches or drains used for agricultural purposes in redeeming swamps, flat water-sheds, &c. These often have to be cleaned and enlarged, and as running water can be had in them at times of heavy rainfalls its force can by this means be utilized.

We are aware that changes in detail may be made in the machine represented to accomplish the same purpose, and we do not therefore desire to confine ourselves to the precise form shown and described.

It will be observed that the excavated material carried out and deposited at the sides of the stream raises the banks, and it will be found that the depth of water behind the plow is greater than that behind the dam, and thus is obtained great additional power. This also acts as a propelling force to carry the whole device forward, and also secures the main supply of water should the head of water behind the dam be lost for any reason, such as a break in the banks, the closing of the dam in passing bridges, and other causes. In such cases the dam, after passing the point, is again set in position to receive it, and the gates being then opened the head of water is not lost, but may be carried for a great distance. The large amount of water set in motion during the use of this device overcomes by its momentum the resistance of such obstacles as may be encountered.

It is obvious that both the plow and the dam may be made of any height desired, and sections added to extend them to any required width, filling any ditch or water-channel.

By reference to the drawings it will be seen that the braces H are connected to the sections of the plow at their lower edges, while the upper sides are connected together by a chain having a swivel and screw for tightening it. By tightening this chain the sections are drawn in at the top, giving the knives on their bottoms a cant to prevent their running too deep, the hinges of the sections being slightly elongated to admit of this rocking motion. In other words, this admits of giving direction to the knives.

Having thus fully described our invention, what we claim as new, and desire to secure by Letters Patent, is—

1. A movable dam having a central frame with wings hinged thereto swinging in or out to dam the stream as the same is forced forward, substantially as and for the purpose set forth.

2. In a movable dam, a central frame carrying one or more tanks into and out of which water is passed at will, in combination with side wings hinged thereto and swinging freely as the stream widens or becomes narrower, substantially as and for the purpose set forth.

3. In a movable dam, a central frame carrying one or more tanks to which the water is supplied or from which it is emptied at will, in combination with hinged side wings formed in a series of jointed sections having their lower edges inclined upward toward their outer ends, and provided with strips of flexible material at their joints and along their lower edges to conform readily to the nature of the stream and render them water-tight, substantially as and for the purpose set forth.

4. The combination, with a movable dam, of a series of pieces hinged to its lower edge and formed with a straight and inclined rear edge, and their forward edges curved so as to always retain their point of contact with the bottom at the same distance in rear of their pivotal point, substantially as shown and described, whereby the volume of water resting upon and acting to pack them into contact with the earth will be the same in horizontal area, however varying in depth, in all cases.

5. The combination, with a movable dam having hinged wings which conform to the shape of the water-course as the dam moves forward, of a plow secured to and drawn by said dam and provided with double hollow mold-boards hinged to and adjustable to and from the central frame or beam, whereby the lateral and upward pressure of the water in the stream is utilized in moving earth therefrom, substantially as shown and described.

6. In a plow for cleaning, widening, and deepening water-courses, a central frame provided with a beam and a cutter, in combination with a hollow mold-board hinged to said frame and provided with means, substantially as described, for admitting and expelling water therefrom, and movable braces for adjusting the hollow wings at any desired angle with the main frame, substantially as and for the purpose set forth.

7. In a plow for cleaning, widening, and deepening water-courses, a central frame provided with a beam and a point and cutter, in combination with hollow wings formed in sections hinged together and thin outer sides curved similar to the mold-board of an ordinary plow, gates in the forward sections to control the passage of water through the wings, gates in each section to admit water to its interior and pumps for discharging it again, and jointed braces connecting each pair of sections across the machine and connected to the main frame by cords or chains by which the wings are forced outward and held rigidly in position, substantially as and for the purpose set forth.

8. The main frame A and its tanks $A'$ $A^2$, having water inlets and outlets $a$ $a^2$ $a^4$, closed by valves $a'$ $a^3$ $a^5$, and carrying the windlasses $B'$ D, in combination with the jointed wings B $B^2$ $B^3$, hinged thereto and provided with cords or chains $b^2$ $d$ $d'$ for controlling their motion, and the flexible material $b$ $b'$ at the joints and along the lower edges of the sections, substantially as and for the purpose set forth.

9. The hinged wings of a movable dam, provided with a series of hinged pieces, C, depending therefrom, formed as herein shown and described, and for the purpose set forth.

10. In a device for cleaning, widening, and deepening water-courses, the frame E, with its beam $E'$, point $E^2$, cutter $e'$, and capstan $H'$, in combination with the hollow sectional mold-boards G, hinged thereto and connected by jointed braces H with their cords $h$, the inlet-openings $g^2$ in each section, and pumps $G'$ and the gates $g^6$ to allow the water to pass through, substantially as and for the purpose set forth.

11. The combination, with a plow for cleaning, widening, and deepening water-courses, of a movable frame retaining a body of water ahead of the plow, through which body of water the excavated material is passed, whereby the water is utilized to aid in lifting and moving the material, substantially as and for the purpose set forth.

12. A plow working under water for deepening, widening, and cleaning water-courses, constructed with hollow mold-boards having means, substantially as described, for filling and emptying them of water, whereby the lifting or floating power of the water is utilized in lifting and moving the material, substantially as and for the purpose set forth.

In testimony whereof we affix our signatures in presence of two witnesses.

BENJAMIN J. GIFFORD.
JAMES E. JONES.

Witnesses as to B. J. Gifford:
  W. C. McArthur,
  A. S. Paré.
Witnesses as to J. E. Jones:
  J. M. Minturn,
  Z. Reynolds.